United States Patent [19]

Takatori et al.

[11] Patent Number: 5,550,805
[45] Date of Patent: Aug. 27, 1996

[54] FAILURE RESTORATION METHOD IN A MESH NETWORK

[75] Inventors: Masahiro Takatori, Hachioji; Yukio Nakano, Zama; Yoshihiro Ashi, Yokohama, all of Japan

[73] Assignee: Hitachi, Ltd., Tokyo, Japan

[21] Appl. No.: 385,408

[22] Filed: Feb. 8, 1995

[30] Foreign Application Priority Data

Feb. 14, 1994 [JP] Japan .................................. 6-017110

[51] Int. Cl.[6] ................................................ H04L 1/22
[52] U.S. Cl. .................................... 370/16.1; 370/94.3
[58] Field of Search .............................. 370/13, 16, 16.1, 370/85.14, 85.15, 94.1, 94.2, 94.3; 395/181, 182.01, 182.02, 183.19, 183.16

[56] References Cited

U.S. PATENT DOCUMENTS

| | | | |
|---|---|---|---|
| 5,179,548 | 1/1993 | Sandesara | 370/16.1 |
| 5,235,599 | 8/1993 | Nishimura et al. | 370/16.1 |
| 5,289,467 | 2/1994 | Kartalopoulos | 370/85.14 |
| 5,327,427 | 7/1994 | Sandesara | 370/16.1 |

OTHER PUBLICATIONS

Bellcore Technical Advisory TA-NWT-001230, Issue 3, Apr. 1993, SONET Bidirectional Line-Switched Ring Equipment Generic Criteria.

Globecom '87 28,2, The Selfhealing Network, W. D. Grover.

*Primary Examiner*—Wellington Chin
*Attorney, Agent, or Firm*—Kenyon & Kenyon

[57] ABSTRACT

A method for constructing a network capable of self-healing from failure in a mesh network and a restoration algorithm are provided. A logical ring is set for each closed loop in the network, and when a failure occurs, the affected traffic is re-routed in the each logical ring toward the opposite direction away from the failure to restore the failed network. The network is divided into a plurality of logical rings to establish the restoration route so that time required for the restoration is shortened.

14 Claims, 16 Drawing Sheets

FIG. 8

BYTE M1 (BIT 1-4)

| BIT 1 | BIT 2 | BIT 3 | BIT 4 |
|---|---|---|---|
| SWITCH PRIORITY (BITS 1-4) ||||

BYTE M1 (BIT 5-8)

| BIT 5 | BIT 6 | BIT 7 | BIT 8 |
|---|---|---|---|
| DESTINATION NODE IDENTIFICATION ||||

BYTE M2 (BIT 1-4)

| BIT 1 | BIT 2 | BIT 3 | BIT 4 |
|---|---|---|---|
| SOUND NODE IDENTIFICATION (BITS 1-4) ||||

BYTE M2 (BIT 5-8)

| BIT 5 | BIT 6 | BIT 7 | BIT 8 |
|---|---|---|---|
| LONG/SHORT | STATUS (BIT 6-8) |||

FIG. 11
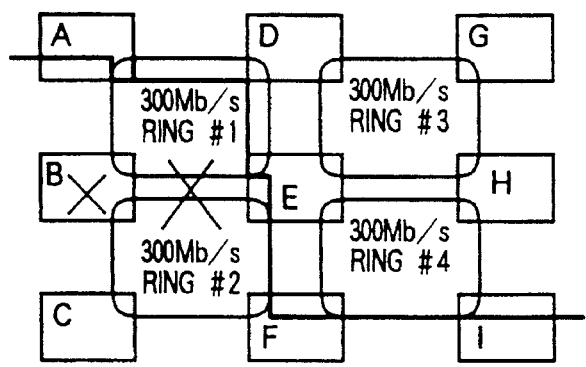
FIG. 12
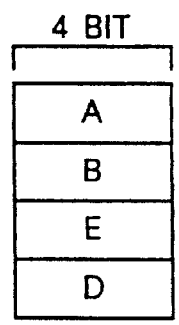
FIG. 13
| | CONNECTION DESTINATION RING NUMBER/ LOGICAL VC NUMBER | ENDING NODE NUMBER IN LOGICAL RING | ENDING NODE NUMBER IN LOGICAL RING | CONNECTION DESTINATION RING NUMBER/ LOGICAL VC NUMBER |
|---|---|---|---|---|
| LOGICAL VC #1 | | A | E | 2/2 |
| LOGICAL VC #2 | | | | |

FIG. 18

| | CONNECTION DESTINATION RING NUMBER/ LOGICAL VC NUMBER | ENDING NODE NUMBER IN LOGICAL RING | ENDING NODE NUMBER IN LOGICAL RING | CONNECTION DESTINATION RING NUMBER/ LOGICAL VC NUMBER |
|---|---|---|---|---|
| LOGICAL VC #1 | | | | |
| LOGICAL VC #2 | 1/1 | E | F | 4/1 |

5,550,805

FAILURE RESTORATION METHOD IN A MESH NETWORK

BACKGROUND OF THE INVENTION

The present invention relates to a failure restoration method in a mesh network for automatically re-routing the traffic for restoration when a failure occurs in a node or a transmission line in a network having a plurality of nodes connected by transmission lines.

As shown in "Bellcore TA-NWT-001230, Issue 3", a method to restore the traffic transmitted over a transmission line, when a failure occurs in a single ring type network by re-routing the affected traffic toward the opposite direction against the failure has been known (hereinafter referred to as prior art method 1). This is a restoration method in the ring type network which consists of a plurality of nodes connected in ring with equal capacity lines and the capacity is divided into two, one half being for working capacity and the other half being for spare capacity, the traffic is normally transmitted by using only the working capacity; when a failure occurs, the spare capacity is used to loop back the traffic in the opposite direction against the normal direction to restore the affected traffic. Namely, the node which detects the failure loops back the traffic, which is output to the affected line, in the opposite direction by using the spare capacity (hereinafter referred to as bridging). Further, the traffic which was received from the working capacity at the location of the occurrence of the failure in the normal state is received from the spare capacity in the opposite direction and it is connected to the working capacity (hereinafter referred to as switching). In this manner, the restoration is achieved in the single ring type network.

In an alternative method, as shown in "GLOBECOM'87 28.2 THE SELFHEALING NETWORK", failure detecting nodes in a mesh network exchange messages and search for an alternate route or a restoration route for restoration (hereinafter referred to as prior art method 2). In this method, one of the failure detecting nodes sends out the message to all adjacent nodes. The contents of the message are 1) a sending node number, 2) a destination node number and 3) a capacity required for the restoration. When a node receives this message, it checks a vacant capacity in the line of the node and simultaneously outputs the message to all output lines which can secure the capacity required for the restoration. By this control, the message passes through a plurality of routes and reaches the other end node. The route through which the first arrived message has passed is adopted for the restoration route. In this manner, the restoration route is searched and the restoration is achieved in the mesh type network.

The prior art method 1, however, cannot be applied to the mesh network and an applicable field is restricted. The prior art method 2 is applicable for mesh networks, however it takes longer time to process. It also has a defect in that it lacks robustness.

SUMMARY OF THE INVENTION

The present invention provides a fast and highly reliable restoring method for a failure detected in a mesh network.

To achieve the above object, in accordance with the present invention, the network is logically divided into a plurality of ring networks and nodes at the both ends of a failure that occurs in a closed range in a logical ring network exchange messages to conduct the restoration operation.

Referring to FIG. 2, a function of the present invention is explained. FIG. 2 shows a network comprising nine nodes, like the network shown in FIG. 3, logically divided into four ring networks.

A capacity of each logical ring is divided into two, one for working and the other for spare, and transmission is normally conducted by using only the working capacity. The traffic affected by a failure travels in the opposite direction away from the failure in the closed area in the logical ring. In this manner, the network can be restored.

For example, when communication is made between a node A and a node I in FIG. 2, a route is set in the order of node A-B-E-F-I. This is shown in FIG. 4. In the nodes A-B-E, the traffic belongs to a logical ring 1, and in the nodes E-F, it belongs to a logical ring 2, and in the nodes F-I, it belongs to a logical ring 4. The following description is an example of the restoration. It is assumed that a failure has occurred in a transmission line between the nodes B-E. In this case, nodes B and E detect the failure and issue a restoration request, and it is only the nodes belonging to the logical rings 1 and 2 that conduct the restoration operation. When the above route is adopted for a restoration route, the node B and the node E exchange the message with each other. Then a restoration route for the traffic between the nodes B-E is determined in the logical rings 1 and 2. The restoration route of the traffic that belongs to the logical ring 1 is B-A-D-E; the restoration route of the traffic belonging to the logical ring 2 is B-C-F-E. Since the above traffic belongs to the logical ring 1 between the nodes B-E, the route after the restoration is A-B-A-D-E-F-I as shown in FIG. 1.

When the transmission is to be made between the node A and the node I, the route setting which causes the connection of the traffic from the logical ring 1 to the logical ring 4 in the node E is inhibited because the traffic cannot be relieved if a failure occurs in the node E.

BRIEF DESCRIPTION OF THE DRAWINGS

FIG. 8 shows details of message identifiers M1 and M8.

FIG. 11 shows an example of restoration for a node B failure.

FIG. 12 shows a ring topology map in the logical ring 1.

FIG. 13 shows a node cross-connect map in the logical ring 1.

FIG. 18 shows a node cross-connect map in the logical ring 2.

DETAILED DESCRIPTION

Figure 2:
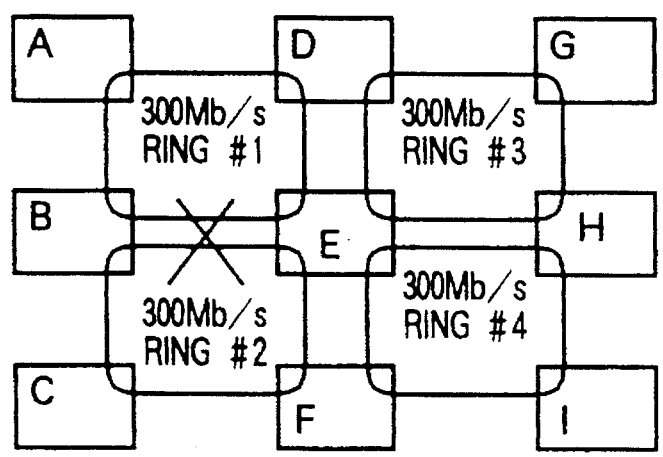
FIG. 2 shows a network divided into logical rings in accordance with the present invention.
Figure 3:
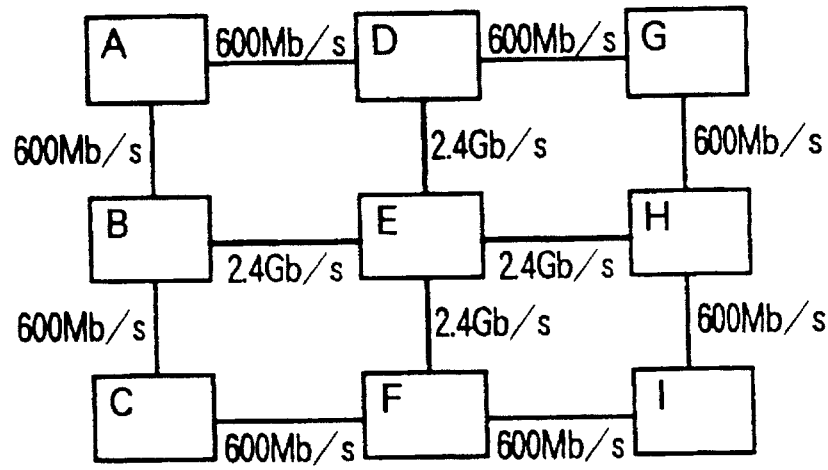
FIG. 3 shows a physical network in the present invention.

Referring to FIG. 2, a first embodiment of the present invention is explained. In FIG. 2, a network consists of nine nodes like the network shown in FIG. 3 and it is logically divided into four ring networks in accordance with four internal closed loops. The four logical rings are referred to as logical rings 1~4. A line capacity between nodes B-E, E-H, D-E and E-F are 2.48832 Gb/s; others are 622.08 Mb/s. The communication between nodes is bi-directional.

Figure 5:
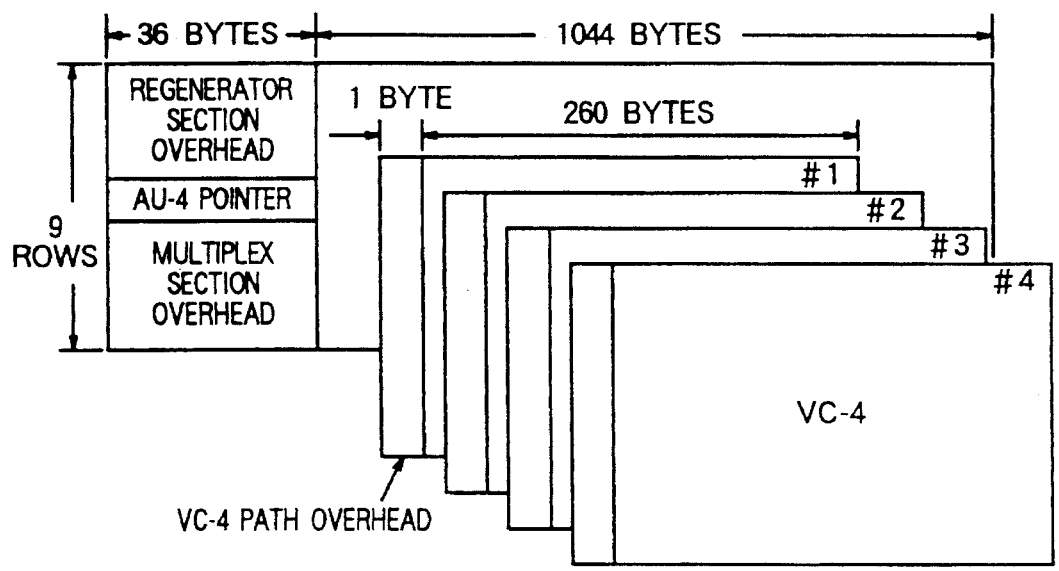
FIG. 5 shows a STM-4 signal defined by the CCITT Recommendation.
Figure 6:
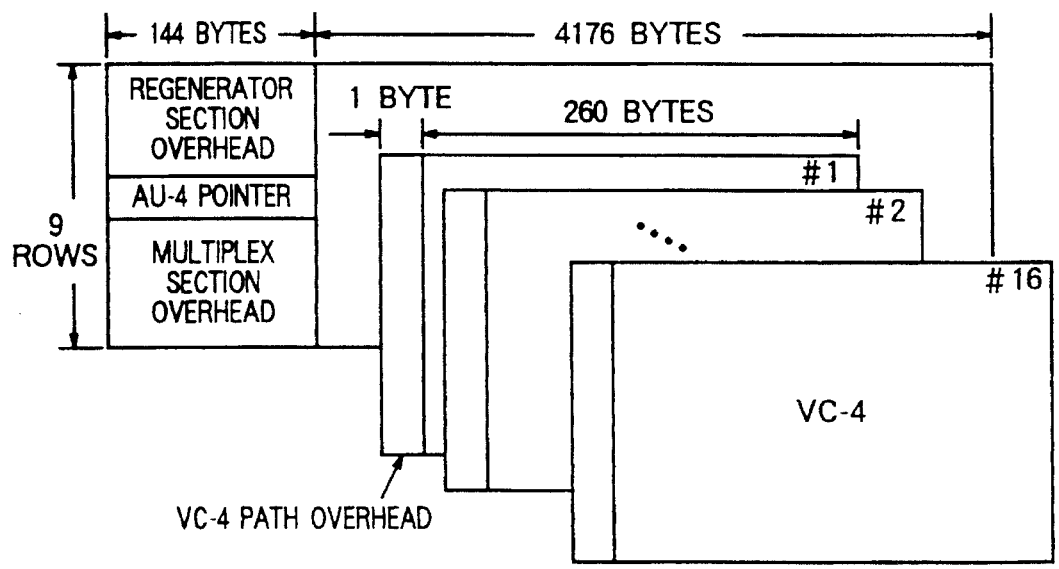
FIG. 6 shows a STM-16 signal defined by the CCITT Recommendation.

A transmission system used in the description of the present invention is a synchronous digital hierarchy (SDH) defined by the CCITT Recommendations G.707, 708 and 709. A frame used in the 622.08-Mb/s line is a synchronous transport module level 4 (STM-4) shown in FIG. 5. A frame used in the 2.48832-Mb/s line is a STM-16 shown in FIG. 6. Both use virtual container level 4s (VC-4s) as transmission payloads. The STM-4 frame accommodates four VC-4s and the STM-16 accommodates 16 VC-4s.

It is assumed that a capacity of the logical ring in the network is 622.08 Mb/s. In the logical ring, the capacity is divided into two, one being used for working and the other for spare. Normally, only the working capacity is used for the transmission, and when a failure occurs, the spare capacity is used for the transmission for the affected traffic. In the present embodiment, the capacity 622.08 Mb/s is divided into two 311.04 Mb/s capacities. Namely, the working capacity of the logical ring is 311.04 Mb/s.

Figure 7:
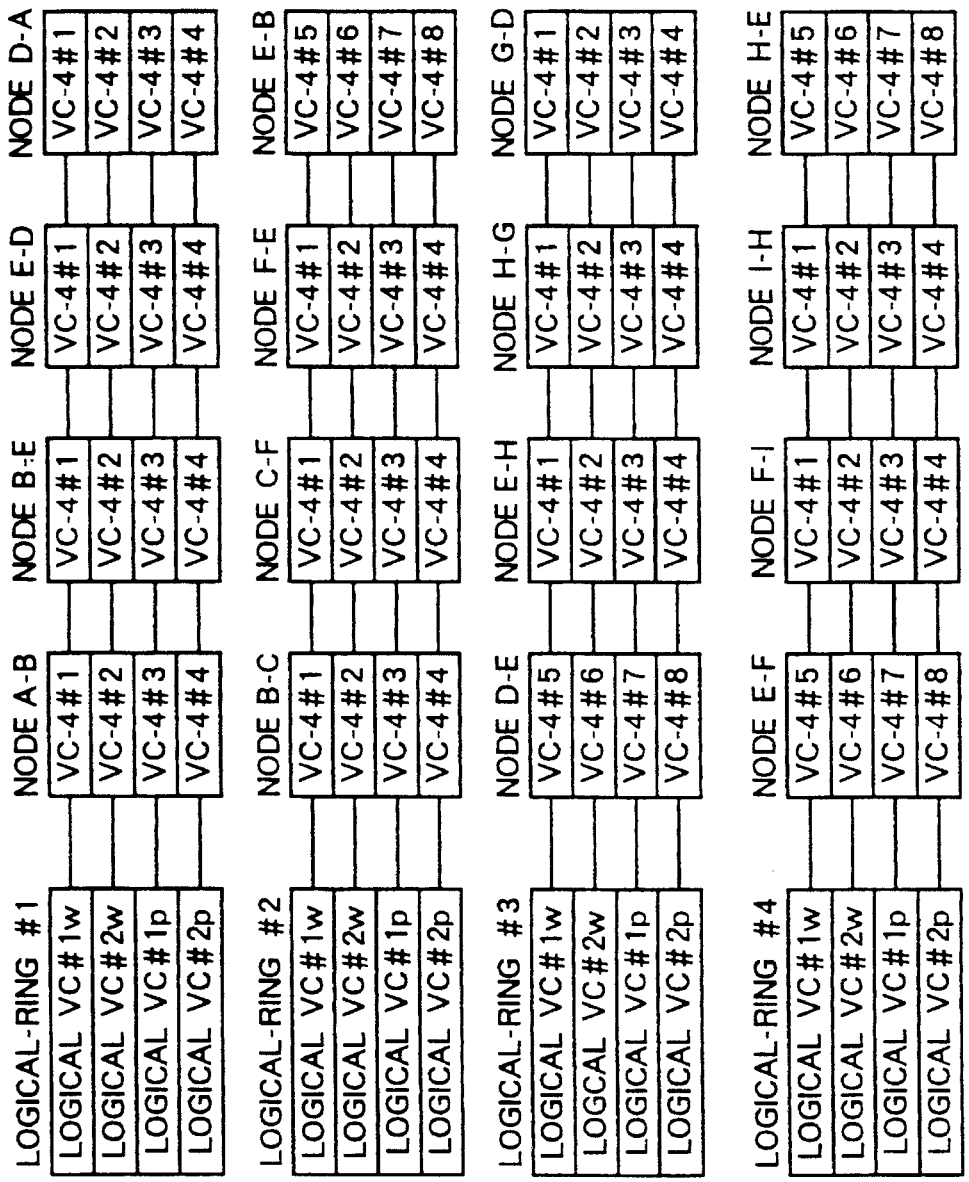
FIG. 7 shows a relation between a physical network and a logical network.

In each logical ring, a logical VC is defined. The logical VC is a group to which the VC's in the transmission line in the logical ring belong. A relation between the logical VC number in the logical ring and the VC number of the line is shown in FIG. 7. For example, in the line between nodes B and E, VC-4 #1 to #4 belong to the logical ring 1, and VC-4 #5 to #8 belong to the logical ring 2. In the logical ring 1, the VC-4 #1 and #2 are used for working capacity and the VC-4 #3 and #4 are used for spare capacity. In the logical ring 2, the VC-4 #5 and #6 are used for working capacity and the VC-4 #7 and #8 are used for spare capacity. In this case, the VC-4 #1 is registered as the working logical VC #1 (logical VC#1w) of the logical ring 1, and the VC-4 #3 is registered as the spare logical VC #1 (logical VC#1p). The VC-4 #5 is registered as the working logical VC #1 (logical VC#1w) of the logical ring 2 and the VC-4 #7 is registered as the spare logical VC #1 (logical VC#1p). In the logical ring, a path is set by using the logical VC number.

Figure 1:
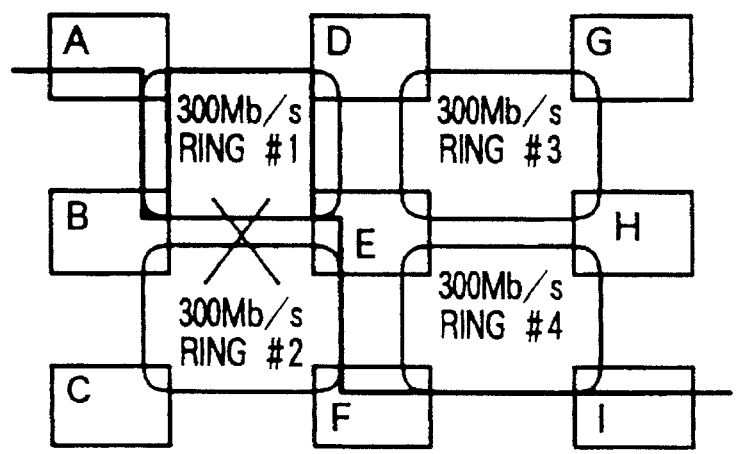
FIG. 1 shows an example of restoration for a line failure.
Figure 4:
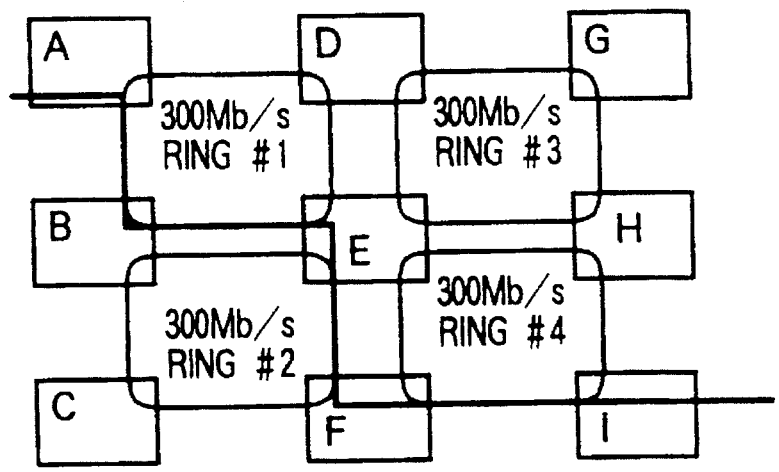
FIG. 4 shows an example of a traffic route through the network.

A method for restoration when a failure occurs is now explained. It is assumed that the signal transmission route is set as shown in FIG. 4. A VC-4 path passes through A-B-E-F-I. The path belongs to the logical ring 1 between the nodes A-B-E and its logical VC number is set to 1. It belongs to the logical ring 2 between the nodes E-F and its logical VC number is 2. It belongs to the logical ring 4 between the nodes F-I and its logical VC number is 1. The following description is an example of restoration operation. It is assumed that a failure has occurred in the transmission line between the nodes B-E. In this case, failure detecting nodes B and E issue restoration requests. It is only the nodes belonging to the logical rings 1 and 2 that conduct the restoration. When the above route is adopted for restoration route, the node B and the node E exchange messages. The restoration route for the traffic between the nodes B-E is determined in the logical rings 1 and 2. The restoration route for the that traffic belongs to the logical ring 2 is B-C-F-E. For the above path, since it belongs to the logical ring 1 between the nodes B-E, the restoration route is A-B-A-D-E-F-I as shown in FIG. 1. The transmission is done by using the working VC on section A-B and section E-F-I, and by using the spare VC on section B-A-D-E.

An operation for the above process in the node is described in further detail. It is assumed that the respective nodes are of the identical configuration. The node E detects a signal failure and sends a massage to the node B. The signalling between the nodes can be similar to the signalling described in "Bellcore TA-NWT-001230, Issue 3".

The message comprises two types of identifiers: M1 and M2. A content thereof is shown in FIG. 8. The bits 1–4 of M1 show a type of switching command and a priority. It is shown in Table 1.

TABLE 1

| | Priority of Switching Request | |
|---|---|---|
| Bits 1–4 | Switching Request Name | Abbreviation |
| 1111 | Lockout protection or Signal Fail [Protection] | LP-P or SF-P |
| 1110 | Forced Switch [Span] | FS-S |
| 1101 | Forced Switch [Ring] | FS-R |
| 1100 | Signal Fail [Span] | SF-S |
| 1011 | Signal Fail [Ring] | SF-R |
| 1010 | Signal Degrade [Protection] | SD-P |
| 1001 | Signal Degrade [Span] | SD-S |
| 1000 | Signal Degrade [Ring] | SD-R |
| 0111 | Manual Switch [Span] | MS-S |
| 0110 | Manual Switch [Ring] | MS-R |
| 0101 | Wait-To-Restore | WTR |
| 0100 | Exerciser [Span] | EXER-S |
| 0011 | Exerciser [Ring] | EXER-R |
| 0010 | Reverse Request [Span] | RR-S |
| 0001 | Reverse Request [Ring] | RR-R |
| 0000 | No Request | NR |

They correspond to the code representing the types of failures and the priorities in the single ring type network shown in "Bellcore TA-NWT-001230, Issue 3". In Table 1, LP-S is a command to inhibit the use of the spare capacity of the line between nodes (hereinafter referred to as span). FS-S is a command to forcibly switch signal in the working capacity into the spare capacity in the same span. FS-R is a command to forcibly loop back the traffic passing through the working capacity of the logical ring so that it passes through the spare capacity in the opposite direction away from the failure in the logical ring. SF-S is a command to automatically switch signal in working capacity into spare capacity when a signal failure occurs. SF-R is a command to automatically loop back the traffic passing through the working capacity of the logical ring so that it passes through the spare capacity in the logical ring in the opposite direction when the signal failure occurs. SD-P is a command to inhibit the use of the spare capacity when a degradation of a signal error rate is detected in the spare capacity. SD-S is a command to automatically switch the signal in working capacity into the spare capacity when the signal error rate degradation occurs. SD-R is a command to automatically loop back the traffic passing through the working capacity so that it passes through the spare capacity in the opposite direction when the signal error rate degradation occurs. MS-S is a command to forcibly switch the signal in working capacity to the spare capacity in the same span. It is of lower priority than FS-S. MS-R is a command to forcibly loop back the traffic passing through the working capacity so that it passes through the spare capacity in the opposite direction. Its priority is lower than FS-R. WTR is issued when working channels meet the restoral threshold after an SD or SF condition. EXER-S exercises span protection switching of the requested channel without completing the actual bridge and switch. EXER-R exercises ring protection switching of the requested channel without completing the actual bridge and switch. RR-S is a response outputted by the node which receives the FS-S, SF-S, SD-S, MS-S or EXER-S. RR-R is a response outputted by the node which receives FS-R, SF-R, SD-R, MS-R or EXER-R. NR is a command which is output when there is no switching request. The priorities of the respective commands are predetermined and the priority is higher as it goes up in the table.

The bits 5–8 of M1 represent a destination node number.

The bits 1–4 of M2 represent the node number which issued the message. The bit 5 of M2 indicates whether the message is output to a short path or a long path. The short path is a segment in which the failure occurs. The long path is a segment other than the failed segment in the logical ring. Namely, in the logical ring 1 of the present embodiment, the section B-E is the short path and the section B-A-D-E is the long path. In the logical ring 2, the section B-E is the short path and the section B-C-F-E is the long path. If the bit 5 of M2 is 1, it indicates that the message has been outputted to the long path, and if the bit 5 of M2 is 0, it indicates that the message has been output to the short path. In the receiving node, whether the received message is the request information or the status information by a combination of the direction of the reception of the message and the value of the bit 5 of the received M2. This is shown in Table 2.

TABLE 2

| | Type of Message | |
|---|---|---|
| | M1 Bits 1–4 code | |
| M2 Bit 5 Code | Ring Bridge Code | Span Bridge Code |
| Long Path | Request | Status |
| Short Path | Status | Request |

The bits 6–8 of M2 represent the status of the node. This is shown in Table 3.

TABLE 3

| M2 Bits 6–8 Status Code | |
|---|---|
| M2 Bits 6–8 | Status |
| 111 | MS-AIS |
| 110 | MS-FERF |
| 101 | Reserved for future use |
| 100 | Reserved for future use |
| 011 | Reserved for future use |
| 010 | Bridged and switched |
| 001 | Bridged |

TABLE 3-continued

| M2 Bits 6–8 Status Code | |
|---|---|
| M2 Bits 6–8 | Status |
| 000 | Idle |

Bridged (Br) indicates the completion of the bridging in the node which sent the message, and bridged and switched (Br&Sw) indicates the completion of the bridging and the switching in the node which sent the message. IDLE indicates that neither the bridging nor the switching is carried out in the node. The content of the message is actually represented by a binary number bit. The following notation is used to simplify the explanation. To represent the contents of M1 and M2, M1=(switching priority)/(destination node number)

M2=(own node number)/(short or long)/(status) are used.

In the present embodiment, the node E detects the failure and sends out a message which contains M1=SF-R/B, M2=E/S/FERF along the short path, and a message which contains M1=SF-R/B, M2=E/L/IDLE along the long path. A byte Z5 of POH (path overhead) of two spare VC-4 in the logical ring is used to transmit the message. Namely, M1 is transmitted by the byte Z5 of VC-4 #3 and M2 is transmitted by the byte Z5 of VC-4 #4.

The node D in the long path receives the message sent by the node E. It checks M1, then detects that the message is not to its own and transmits the message to the succeeding stage (node A) in the logical ring 1. In the logical ring 1, the receiving spare logical VC is also connected to the transmitting spare logical VC. Similar process is conducted in the node A.

The node B receives the message along the short path (M1=SF-R/B, M2=E/S/FERF) of the messages output by the node E. Thus, the node B detects the occurrence of the failure in B-E and sends out a message which contains M1=RR-R/E, M2=B/S/IDLE along the short path and a message which contains M1=SF-R/E, M2=B/L/IDLE along the long path.

The node B then receives the message along the long path (M1=SF-R/B, M2=E/L/IDLE) output by the node E. Since it receives a valid switching request from the restoration route, the node B executes the bridging and the switching. Namely, the traffic which has heretofore been sent to the node E is bridged to the spare logical VC toward the node A. Namely, the logical VC-4 #1 and #2 between the nodes B-E are bridged to the logical VC-4 #3 and #4 between the nodes B-A. Further, the logical VC-4 #1 and #2 which have heretofore been received from the node E are switched to the logical VC-4 #3 and #4 received from the node A. A message which contains M1=RR-R/E, M2=B/S/Br&Sw is sent along the short path and a message which contains M1=SF-R/E, M2=B/L/Br&Sw is sent along the long path.

The node A receives the message sent by the node B. It checks M1 to determine that it is not to its own and transmits it to the succeeding stage (node D) in the logical ring 1. A similar process is conducted in node D.

The node E receives the message (M1=SF-R/B, M2=E/L/IDLE) sent by the node B along the long path. It receives a normal switching request from the restoration route and bridges the traffic which has heretofore been sent toward the node B to the spare logical VC toward the node D. Namely, the logical VC-4 #1 and #2 between the nodes B-E are bridged to the logical VC-4 #3 and #4 between the nodes E-D. Further, the logical VC-4 #1 and #2 which have heretofore been sent by the node B are switched to the logical VC-4 #3 and #4 sent by the node D. A message which contains M1=RR-R/B and M2=E/S/FERF travels along the short path and a message which contains M1=SF-R/B, and M2=E/L/Br&Sw travels along the long path.

Figure 9:
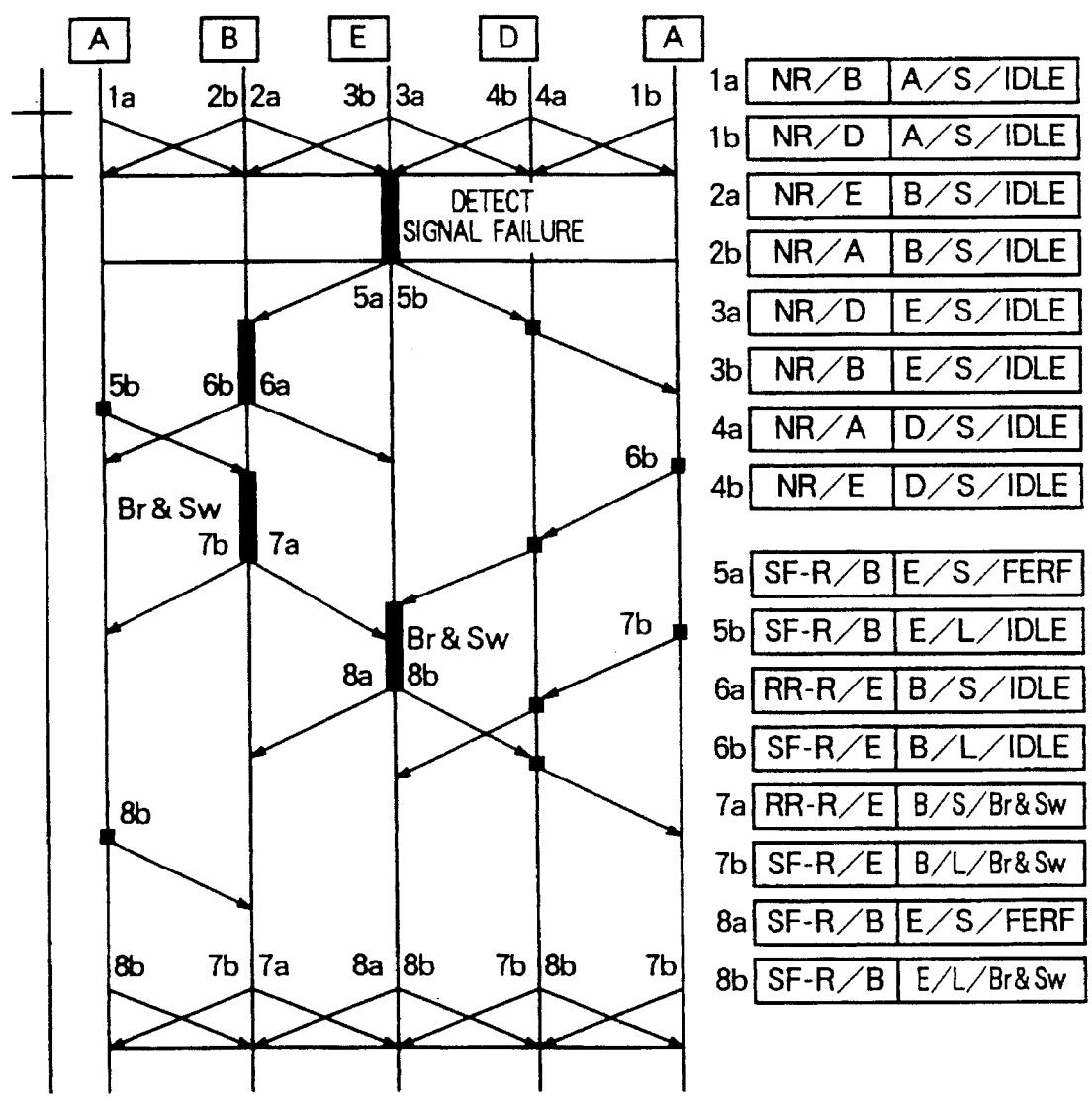
FIG. 9 shows a message transmission sequence in a logical ring 1 upon line failure.
Figure 10:
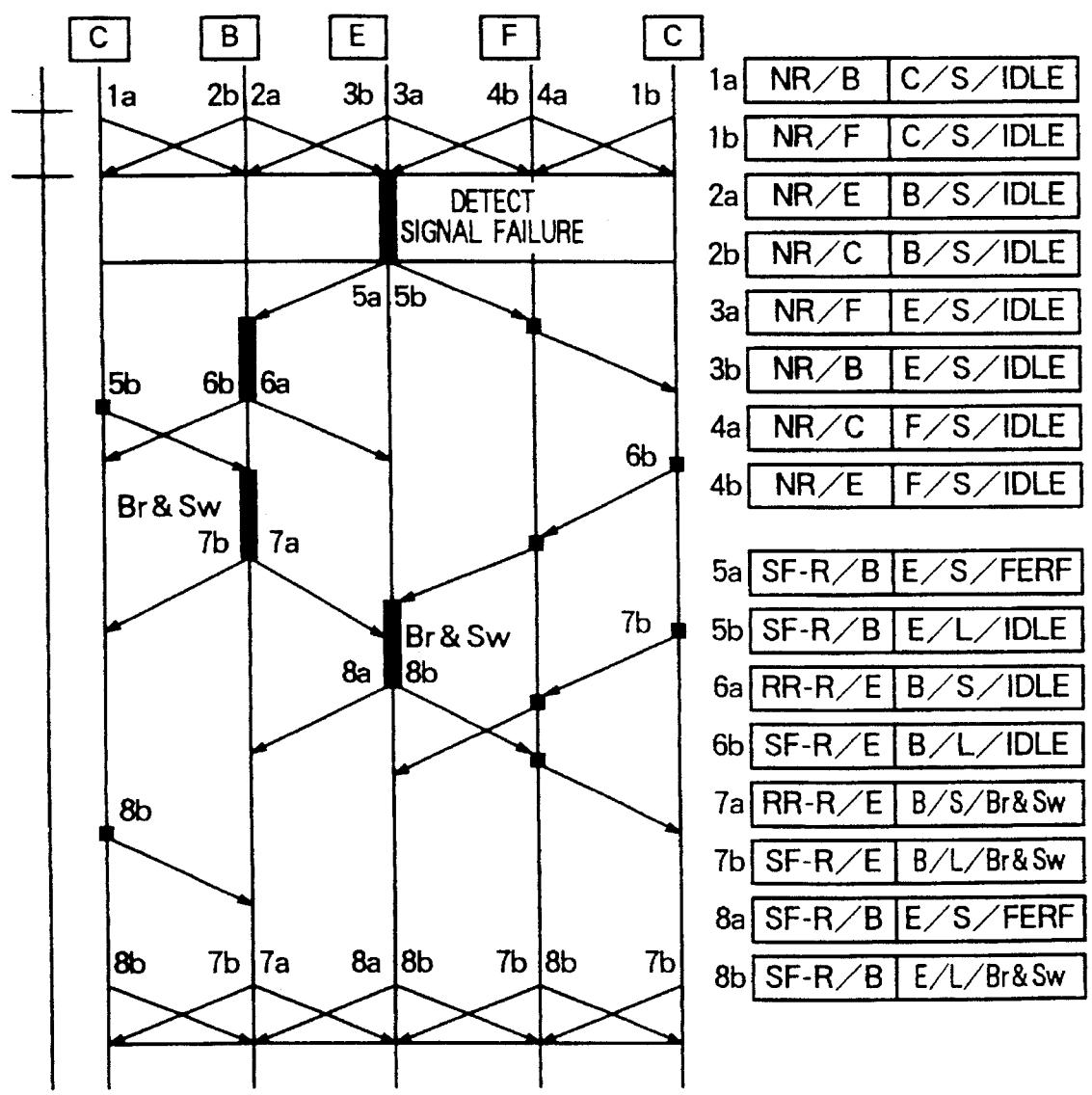
FIG. 10 shows a message transmission sequence in a logical ring 2 upon line failure.

In this manner, the messages are exchanged between the nodes B and E; the restoration route shown in FIG. 1 is established. FIG. 9 shows a transmission sequence of the message in the logical ring 1. By using the established restoration route, the signal passes through the route A-B-A-D-E-F-I. Path A-B is the working logical VC of the logical ring 1; path B-A-D-E is the spare logical VC of the logical ring 1; path E-F is the working logical VC of the logical ring 2; path F-I is the spare logical VC of the logical ring 4.

A process for recovery from a failure that occurs in the node B is now explained. It is assumed that a signal transmission route is set as shown in FIG. 4. In the present embodiment, when a failure occurs in the node B, the nodes A and E detect the failure in the logical ring 1. In the logical ring 2, the nodes C and E detect the failure. Accordingly, when the failure occurs in the node B, it is not the logical ring 1 but the failure detecting nodes A and E that issue restoration requests in the logical ring 1 and the failure detecting nodes C and E in the logical ring 2. In the logical ring 1, the node A and the node E exchange messages to establish the restoration route for the traffic on section A-B and section B-E by using the spare capacity in the section A-D-E. In the logical ring 2, the node C and the node E exchange the messages to establish the restoration route for the traffic on section C-B and section B-E by using the spare capacity in section C-F-E. For the path shown in FIG. 4, since it belongs to the logical ring 1 on section A-B-E, the route after the restoration from the failure is A-D-E-F-I as shown in FIG. 11. The transmission is done by using the spare VC on section A-D-E and by using the working VC on section E-F-I.

An operation of the node in the above process is explained in detail. After the occurrence of the failure, the node E detects the failure and sends out a message which contains MI=SF–R/B and M2=E/S/FERF along the short path and a message which contains M1=SF–R/B and M2=E/L/IDLE along the long path. The node A also detects the failure and sends out a message which contains M1=SF–R/B, M2=A/S/FERF along the short path and a message which contains M1=SF-R/B, M2=A/L/IDLE along the long path.

The node D in the long path receives the messages sent by the nodes E and A. It checks M1, then detects that the message is not addressed to its own and relays it to the succeeding stage. In the logical ring 1, it connects the receiving spare logical VC to the transmitting spare logical VC.

The node A then receives the message (M1=SF–R/B, M2=E/L/IDLE) along the long path sent from the node E. Thus, it recognizes that the nodes A and E simultaneously detect the failures of the same level and detect that the failure has occurred in the node B. In order to identify the node B which is the failed node, each node has ring topology map which contains the information of the node numbers of all nodes belonging to the logical ring. The ring topology map of the logical ring 1 is shown in FIG. 12. It shows the node numbers belonging to the logical ring 1. The node A looks up the ring topology map originating from its own node toward the opposite direction to against the direction of the reception of the message (counterclockwise in the present embodiment). It determines that the all node number (only the node B in the present embodiment) read before the node number of the node E appears is the failure node.

The node A then detect whether the path is terminated or crossed over to another logical ring at the failure node (node B). This is done by using the node cross-connect map distributed from the management system. The node cross-connect map in the present embodiment is shown in FIG. 13. The node cross-connect map shows the transmitting nodes and the receiving nodes of each logical VC that belongs to the logical ring. It also shows the logical ring number and the logical VC numbers in the logical ring when the logical VC is connected to other logical ring. When the logical VC is output to other logical ring, the logical ring number and the logical VC number in the logical ring are described. In the present embodiment, the number of logical VC set in the network is only one and it is not connected to the other logical ring in the node B. Accordingly, the node A bridges the traffic which has heretofore been sent toward the node B to the spare logical VC toward the node D. Namely, it bridges the logical VC #1 and #2 to the logical VC #1p and #2p. Further, it switches the logical VC #1w and #2w which have heretofore been received along the node B to the logical VC #1p and #2p receiving from the node D. After the completion of the above process, it sends out a message which contains M1=SF–R/B, M2=A/S/FERF along the short path and a message which contains M1=SF–R/B, M2=A/L/Br&Sw along the long path.

In the node E, the message sent from the node A is received in the same manner to detect the failure in the node B. It executes the bridging and the switching and sends out a message which contains M1=SF–R/B, M2=E/S/FERF along the short path and a message which contains M1=SD–R/B, M2=E/L/Br&Sw along the long path.

Figure 14:
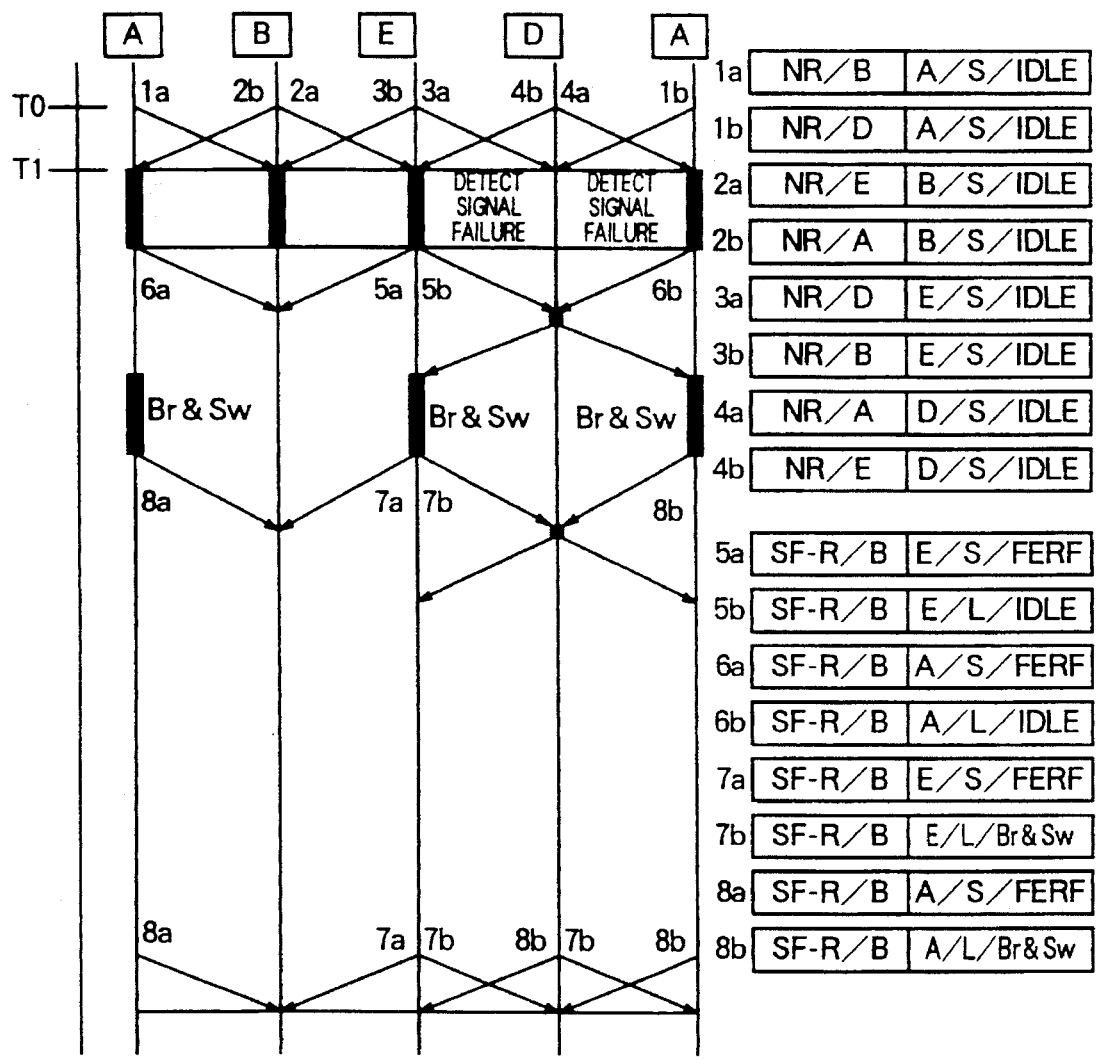
FIG. 14 shows a message transmission sequence in the logical ring 1 upon node B failure.
Figure 15:
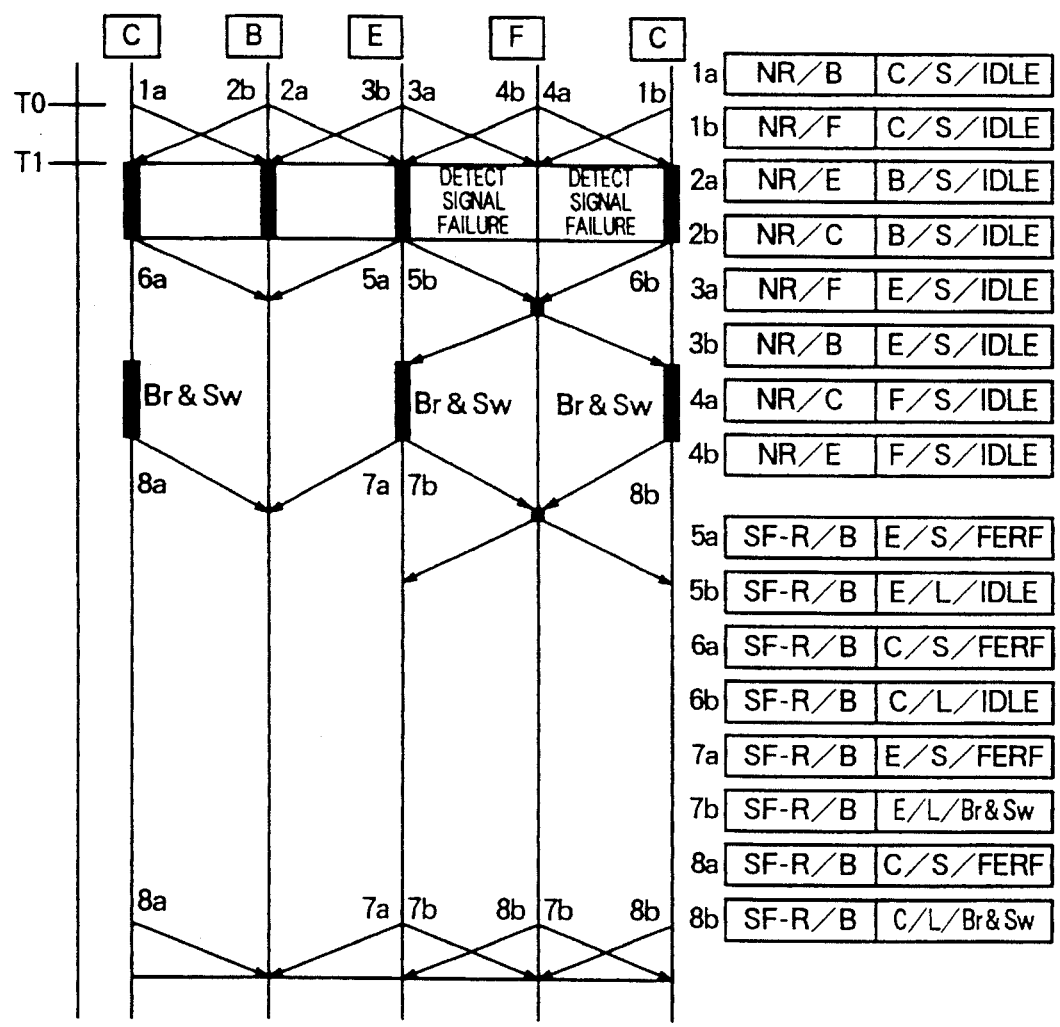
FIG. 15 shows a message transmission sequence in the logical ring 2 upon node B failure.

The messages are exchanged between the nodes A and E, then the restoration route is established. FIG. 14 shows a transmission sequence of the message in the logical ring 1. FIG. 15 shows a transmission sequence in the logical ring 2. The path passes through the route A-D-E-F-I by using the established restoration route. Of the route, the section A-D-E uses the spare logical VC of the logical ring 1, the section E-F uses the working logical VC of the logical ring 2 and the section F-I uses the working logical VC of the logical ring 4.

Finally, a process when a failure occurs in the node E is explained. It is assumed that the signal transmission route is set as shown in FIG. 4. In the present embodiment, when a failure occurs in the node E, the nodes B and D detect the failure in the logical ring 1. In the logical ring 2, the nodes B and F detect the failure. In the logical ring 3, the nodes D and H detect the failure. In the logical ring 4, the nodes F and H detect he failure. Accordingly, when the failure occurs in the node E, it is the failure detecting nodes B and D that issue restoration request in the logical ring 1, and the failure detecting nodes B and F in the logical ring 2 that issue restoration requests. In the logical ring 3, it is the nodes D and H, and in the logical ring 4, it is the nodes F and H that issue restoration requests.

Figure 16:
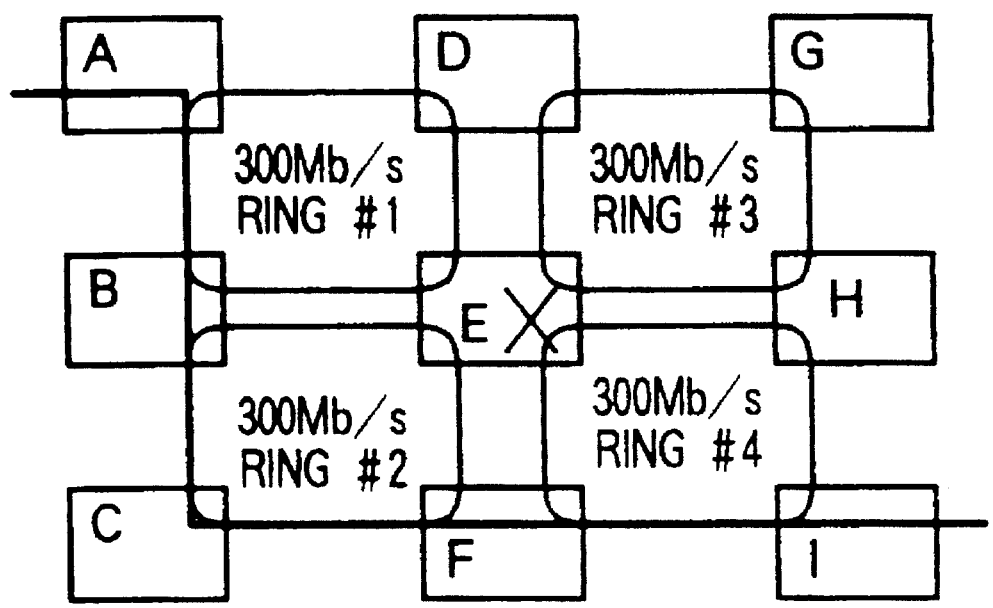
FIG. 16 shows an example of restoration for a node E failure.

In the logical ring 1, the nodes B and the node D exchange the messages and establish the restoration route for the affected traffic between the nodes B-E and D-E by using the spare capacity on section B-A-D. In the logical ring 2, the node B and the node F exchange messages and establish the restoration route for the traffic on section B-E and on section F-E by using the spare capacity in section B-C-F. In the logical ring 3, the nodes D and the node H exchange messages and establish the restoration route for the traffic on section D-E and section H-E by using the spare capacity in section D-G-H. In the logical ring 4, the node F and the node H exchange messages and establish the restoration route for the traffic on section F-E and section H-E by using the spare capacity in section F-I-H. For the path shown in FIG. 4, it belongs to the logical ring 1 in section A-B-E. However, it is not possible to establish a path between the node A and the node I if the spare capacity in section B-A-D is used. Accordingly, in the node B, the path is not looped back to the restoration route in the logical ring 1 but connected to the spare capacity of the logical ring 2. The route after the restoration from the failure is A-B-C-F-I as shown in FIG. 16. The transmission is made by using the working VC between A and B, using the spare VC in section B-C-F and using the working VC between F and I.

An operation of the node in the above process is now described in detail. After the failure has occurred, in the logical ring 1, the nodes B and D detect the failure. In the logical ring 2, the nodes B and F detect the failure. The operation in the logical ring 1 is described below.

The node D detects the failure, then sends out a message which contains M1=SF–R/E, and M2=D/S/FERF along the short path and a message which contains M1=SF–R/E, M2=D/L/IDLE along the long path. The node B also detects the failure, then sends out a message which contains M1=SF–R/E, M2=B/S/FERF along the short path and a message which contains MI=SF–R/E, M2=B/L/IDLE along the long path.

The node A in the long path receives the messages sent by the nodes B and D. It checks M1, then knows that the message is not addressed to its own node and relays it to the succeeding stage. In the logical ring 1, the receiving spare logical VC is connected to the transmitting spare logical VC.

The node B receives the message (MI=SF–R/E, M2=D/L/IDLE) along the long path sent from the node D. Thus, it recognizes that the nodes B and D simultaneously detect the failures of the same level and detects that the failure has occurred in the node E. The node B detects that the priorities of the received messages M1 are same and they are sent by node D, and looks up the ring topology map starting from its own node in the opposite direction against the direction of the message arrived (counterclockwise in the present embodiment). It recognizes that the node number read before the node number D appears (only the node E in the present embodiment) is the failure node.

The node B then detects whether the path is terminated at the failure node (node E) or connected to other logical ring. This is done by using the node cross-connect map distributed from the management system. The node cross-connect map in the present embodiment is shown in FIG. 13. In the present embodiment, it shows that a logical VC is connected to the logical ring 2 at the node E. Since the node B belongs to the logical ring 2, in order to connect the logical VC to the logical ring 2, the logical VC is bridged to the logical VC ID4 in the logical ring 2.

After the completion of the above process, the node B sends out a message which contains M1=SF–R/E and M2=B/S/FERF along the short path and a message which contains M1=SF–R/E, and M2=B/L/Br&Sw along the long path.

Figure 17:
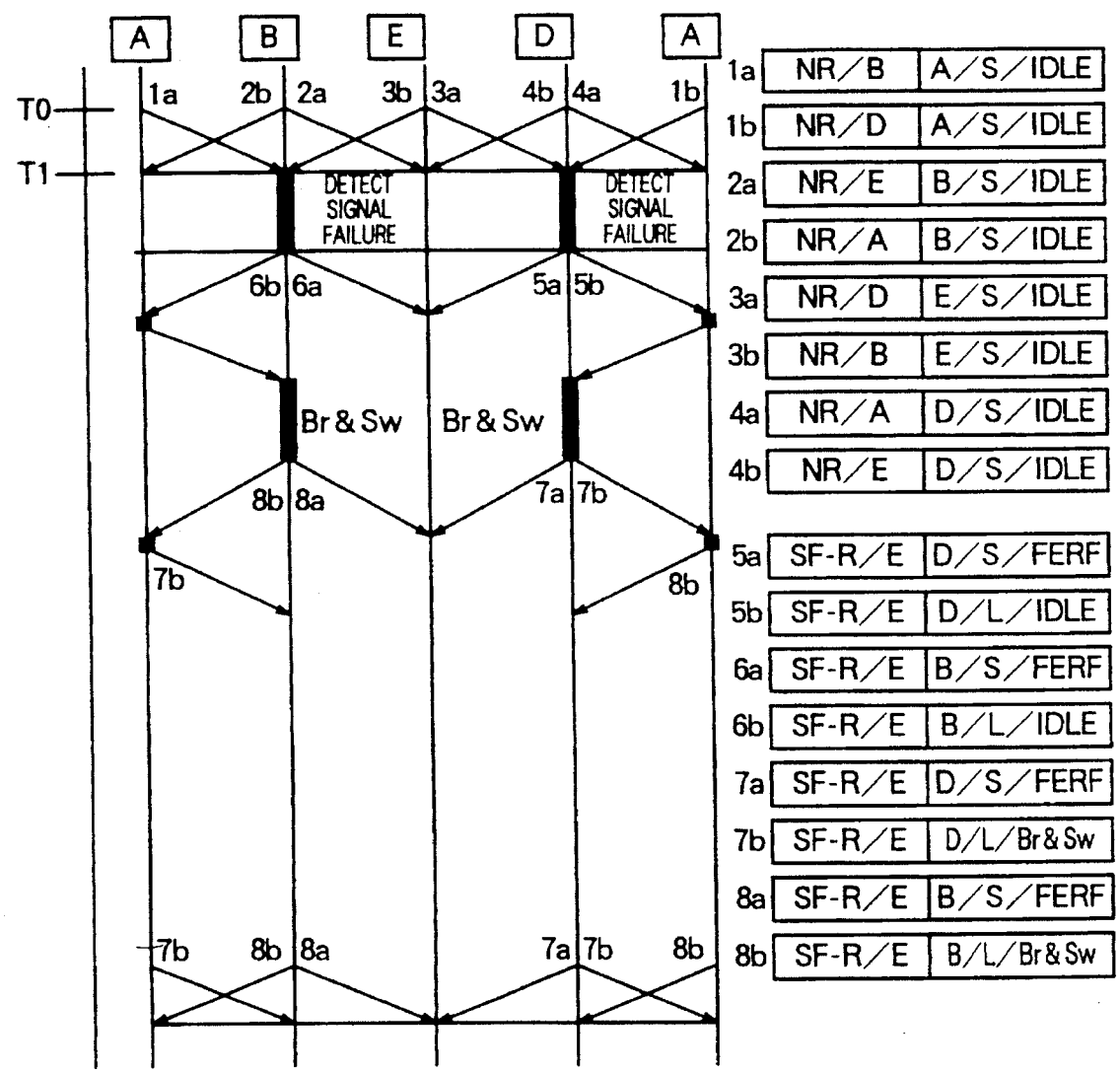
FIG. 17 shows a message transmission sequence in the logical ring 1 upon node E failure.

The node D receives the message sent by the node B and detects the failure of the node E. It conducts the bridging and the switching, then sends out a message which contains M1=SF–R/E, M2=D/S/FERF along the short path and a message which contains M1=SF–R/E, M2=D/L/Br&Sw along the long path. A transmission sequence of the message in the logical ring 1 is shown in FIG. 17.

An operation in the logical ring 2 is now explained. In the logical ring 2, the same operation as that described above is carried out between the node B and the node F.

The node F detects the failure and sends out a message which contains M1=SF–R/E, M2=F/S/FERF along the short path and a message which contains M1=SF–R/E, M2=F/L/IDLE along the long path. The node B also detects the failure, then sends out a message which contains M1=SF–R/E, M2=B/S/FERF along the short path and a message which contains MI=SF–R/E, M2=B/L/IDLE along the long path.

The node C in the long path receives the messages sent by the node B and the node F. It checks M1, then knows that the message is not addressed to its own node and relays it to the succeeding stage. In the logical ring 2, it connects the receiving spare logical VC to the transmitting spare logical VC.

The node F receives the message (MI=SF–R/E, M2=B/L/IDLE) along the long path sent by the node B. It recognizes that the node B and the node F simultaneously detect the failures of the same priority level and defects that the failure has occurred in the node E. The node F looks up the ring topology map starting from its own node in the opposite direction against the direction of the message arrived (counterclockwise in the present embodiment). It recognizes that the node number read before the node number B appears (only the node E in the present embodiment) is the failure node.

The node F then detects whether the path is terminated at the failure node (node E) or is connected to other logical ring. This is conducted by using the node cross-connect map distributed from the management system. The node cross-connect map in the present embodiment is shown in FIG. 18. In the present embodiment, it shows that there is a logical VC which is connected to the logical ring 1 in the node E. The node F does not belong to the logical ring 1. Accordingly, in order to connect the logical VC to the logical ring 1, it is bridged to the spare logical VC in the logical ring 2 (logical VC ID4 in the present embodiment) in the node F.

After the completion of the above process, the node F sends out a message which contains M1=SF–R/E and M2=F/S/FERF along the short path and a message which contains M1=SF–R/E, M2=F/L/Br&Sw along the long path.

Figure 19:
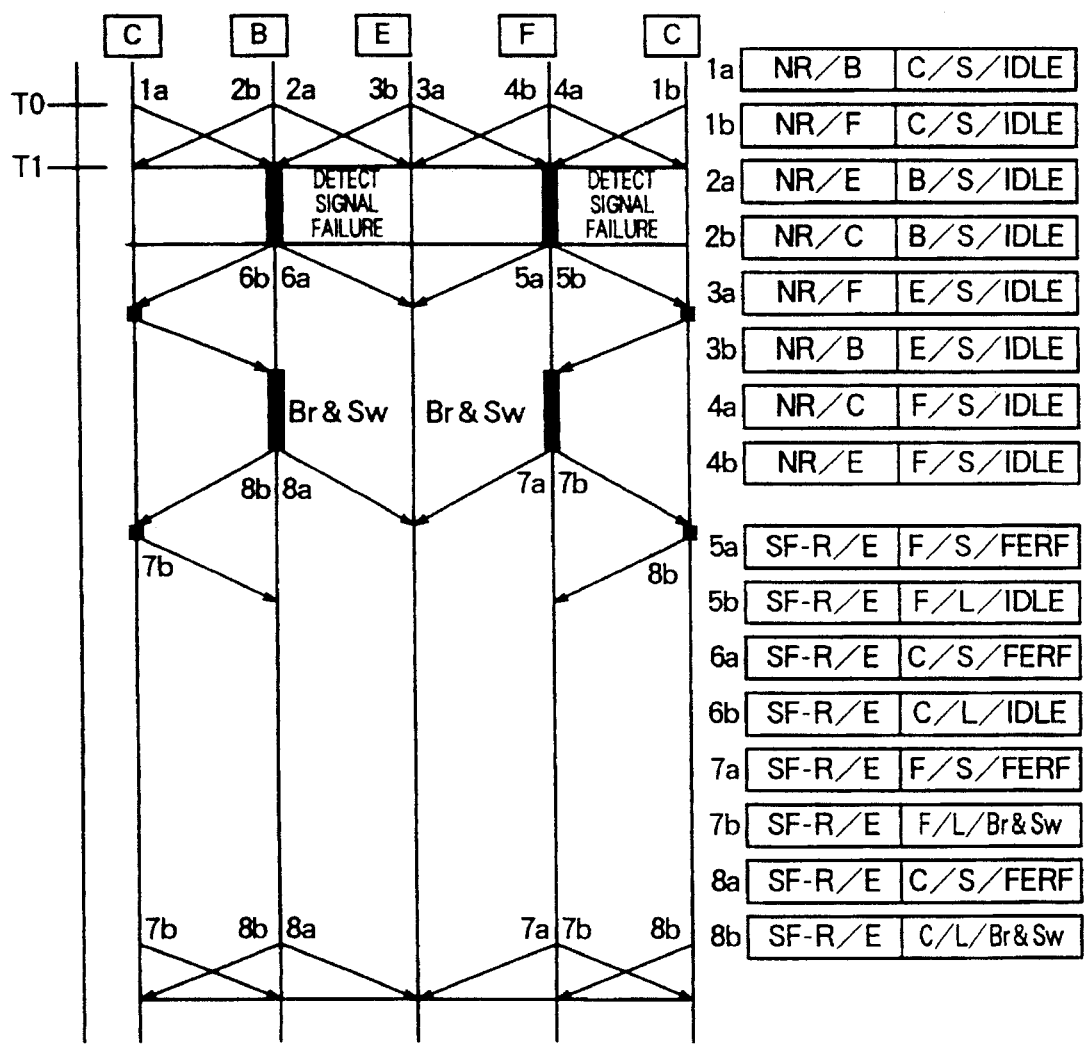
FIG. 19 shows a message transmission sequence in the logical ring 2 upon node E failure.

The node B also receives the message sent by the node F and detects the failure of the node E. It conducts the bridging and the switching and sends out a message which contains M1=SF–R/E, M2=B/S/FERF along the short path and a message which contains M1=SF–R/E, M2=B/L/Br&Sw along the long path. The transmission sequence of the message in the logical ring 2 is shown in FIG. 19.

The path passes through the route A-B-C-F-I by using the established restoration route. The section A-B uses the working logical VC of the logical ring 1, the section B-C-F uses the spare logical VC of the logical ring 2 and the section F-I uses the working logical VC of the logical ring 4.

Figure 20:
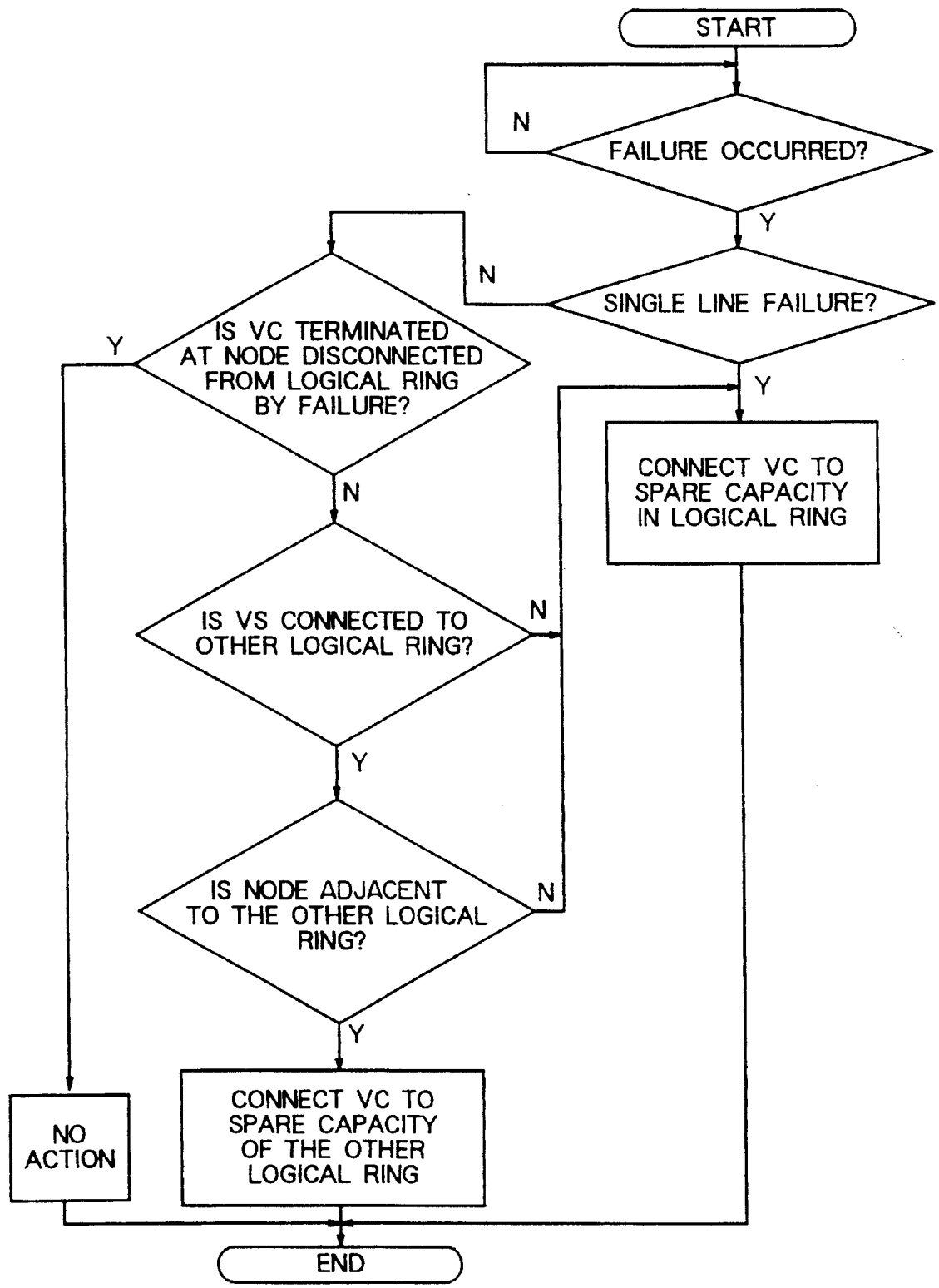
FIG. 20 shows a process flow chart of the node.

A flow chart of the process in each node is shown in FIG. 20. In FIG. 20, the node disconnected from the logical ring is one which cannot be connected to the logical ring because of the node failure or multiple line failure. In FIG. 16, the node E corresponds to it.

Figure 21:
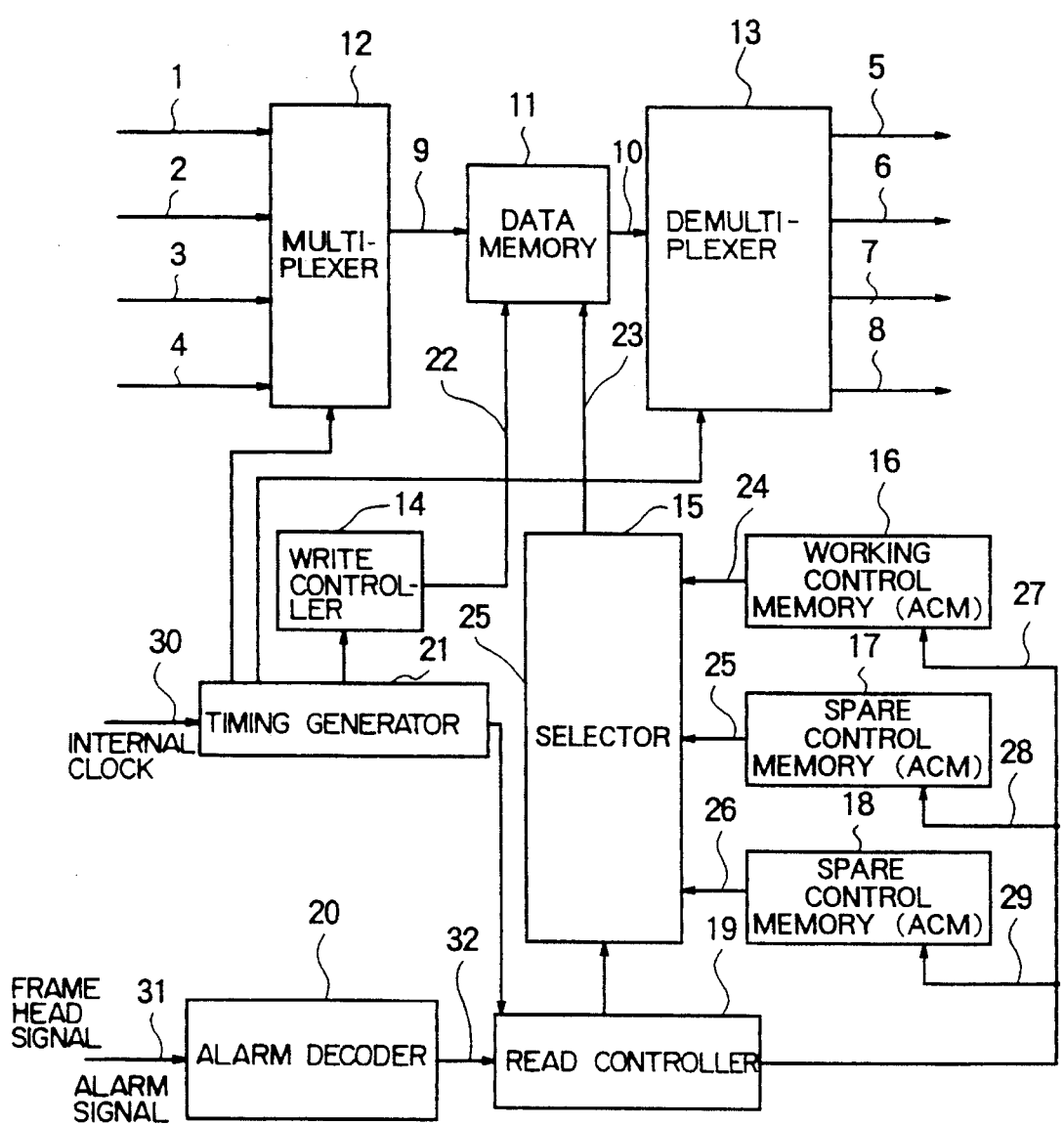
FIG. 21 shows a configuration of a switch of the node.

In the node which adopts the above mentioned method, the above operation can be conducted fast by providing a plurality of time-division switch address control memories (ACM's). As shown in FIG. 21, three ACM's are provided one of which is assigned for normal use (ACM 16), one for single line failure (ACM 17) and one for node failure (ACM 18). A selector 15 is controlled to select an ACM to be used for reading a data memory 11 for each reading of VC, from the three ACM's. In FIG. 21, reference numerals 1 to 4 designate input-highways, 5 to 8 output-highways, 9 to 10 highways, 11 a data memory, 12 a multiplexer, 13 a demultiplexer, 14 a write controller, 16 to 18 the ACMs (address control memories), 19 a read controller, 20 an alarm decoder, 21 a timing generator, 22 a write address line, 23 a read address line, 24 an address used in a normal state, 25 an address used in a single line failure state, 26 an address used in a node failure state, 27 a read address used in the ACM, 28 a system clock, 29 alarm information, 30 an internal clock, and 31 to 32 alarm signals.

An operation of the node E when a failure occurs in only the line between the nodes B-E is explained. Normally, the selector 15 selects the ACM 16. After the failure has occurred, the signal of logical VC related to the path which has passed through the failure section, that is, the logical VC belonging to the logical rings 1 and 2, is read from data memory 11 by using the ACM 17 in node E so that the loop-back to the spare logical VC in the logical rings 1 and 2 is attained. The other VC which are not affected are read by using the ACM 16 in the normal manner.

An operation of the node E when a failure occurs in the node B is explained. After the failure has occurred, the signal of the VC connected to other logical ring from the failure node (node B) is read from data memory 11 by using the ACM 18 in node E to attain the loop-back to the spare logical VC of the other logical ring. The signal of the logical VC belonging to the path which has passed through the failure node and is not connected to the other logical ring at the failure node is read out from data memory 11 by using the ACM 17 in node E to attain the loop-back to the spare logical VC in the logical ring. The signal of the logical VC which is not affected is read out from data memory 11 by using the ACM 16 in the node E.

In the present embodiment, since only four bits are assigned for the node number indication in M1 and M2, the number of nodes belonging to each logical ring is no larger than 16. However, the restriction on this number may be eliminated by using the multi-frame technique and increasing the capacity of the transmission bytes.

In the present embodiment, the byte Z5 in VC-4 POH is used for the transmission of the message between the nodes. Alternatively, a DCC (data communication channel) in a section overhead may be used.

While only the embodiment for SF-R was shown, other commands may be readily implemented.

In accordance with the present invention, since the network is divided into a plurality of logical rings to establish a restoration route, a time required to restore from the failure can be shortened.

What is claimed is:

1. A method for restoring a failed mesh network in which each closed loop in the network is defined as a logical ring, each channel transmitted in multiplexed form in a transmission line is assigned to one of the logical rings, the channels belonging to the logical ring are divided into two groups, one being a working channel group and the other being a spare channel group, the method for restoring comprising the steps of:

normally transmitting a signal over working channels of a logical ring; and when a failure occurs in a transmission line transmitting the affected traffic from one of the end nodes of the failed line to the other end node of the failed line by using the spare channel in said logical ring in which said failure occurs away from the failed line;

whereby the restoration from the failure is attained.

2. The method for restoring a failed mesh network according to claim 1 further comprising the step of:

exchanging messages, which contain identifiers of the nodes which detect the failure and identifiers of the traffic affected by the failure, between the nodes in each logical ring that belongs to the failed mesh network to conduct the restoring method automatically.

3. The method for restoring a failed mesh network according to claim 2 further comprising a step of:

assigning a logical channel number to a channel belonging to a logical ring;

informing all nodes in a logical ring of identifiers of logical channels passing through a logical ring.

4. The method for restoring a failed mesh network according to claim 2 wherein for a given logical ring each node holds information on identifiers of nodes that belong to the given logical ring.

5. The method for restoring a failed mesh network according to claim 2 wherein each node of a logical ring holds information of an entry node number and an exit node number of all traffic in the logical ring and when traffic is connected to an adjacent logical ring, each node of logical ring holds information on the identifier of the said adjacent logical ring and the logical channel number assigned to traffic in the said adjacent logical ring.

6. The method for restoring from failure in a mesh network according to claim 2 wherein all nodes in a logical ring hold information including identifiers of logical rings number that belong to the mesh network.

7. The method for restoring a failed mesh network according to claim 2 wherein when traffic is set to cross two logical rings in the mesh network, a route of the traffic passes through at least two nodes which belong to both of the two logical rings.

8. A method for restoring a failed mesh network according to claim 1 wherein said network uses a synchronous digital hierarchy (SDH) defined by the CCITT Recommendations G.707, 708 and 709 or synchronous optical network (SONET) defined by the ANSI T1.105.

9. A method for restoring a failed mesh network according to claim 8 wherein said channel is a virtual container (VC) defined by the CCITT Recommendations G.707, 708 and 709 or a synchronous transport signal level N synchronous payload envelope (STS-N SPE) defined by the ANSI T1.105.

10. A method for restoring a failed mesh network according to claim 8 wherein the transmission of the message between the nodes uses a path overhead in an SDH or a SONET frame.

11. A method for restoring a failed mesh network according to claim 8 wherein the transmission of the message between the nodes uses a data communication channel (DCC) in a section overhead of an SDH or a SONET frame.

12. A method for restoring a failed mesh network in which each closed loop in the network is defined as a logical ring, each channel transmitted in multiplexed form in a transmission line is assigned to one of the logical rings, the channels belonging to the logical ring are divided into two groups, one being a working channel group and the other being a spare channel group, the method for restoring comprising the steps of:

when a failure occurs in a logical ring and no node is disconnected from the logical ring by the failure or a node is disconnected but the affected traffic is connected to another node in the logical ring with the disconnected node, transmitting the affected traffic from one of end nodes of the failed segment in said logical ring to the other end node of the failed segment in said logical ring by using the spare channel in said logical ring away from the failed segment;

whereby the restoration from the failure is attained.

13. A method for restoring failed a mesh network in which each closed loop in the network is defined as a logical ring, each channel transmitted in multiplexed form in a transmission line is assigned to one of the logical rings, the channels belonging to the logical ring are divided into two groups, one being a working channel group and the other being a spare channel group, the method for restoring comprising the steps of:

when a failure occurs in a logical ring and a node is disconnected from the failed logical ring, and the affected traffic is connected to another logical ring which is adjacent to said failed logical ring, and the one end node of the failed segment in the failed logical ring also belongs to said another logical ring, connecting the affected traffic to the spare channel of said another logical ring at the failure detecting node belongs to the failed logical ring and transmitting the traffic to the other failure detecting node which belongs to said another logical ring;

whereby the restoration from the failure is attained.

14. A method for restoring a failed mesh network in which a closed loop in the network is defined as a logical ring, each channel transmitted in multiplexed form in a transmission line is assigned to one of the logical rings, the channels belonging to the logical ring are divided into two groups, one being a working channel group and the other being a spare channel group, the method for restoring comprising the steps of:

when a failure occurs in a logical ring and a node is disconnected from the failed logical ring and the affected traffic is connected to another logical ring in the node at which the said traffic is disconnected by the failure, and the failure detecting node in the failed logical ring does not belong to the another logical ring, connecting the said traffic to the spare channel of the failed logical ring, and transmitting the traffic to the failure detecting node that belongs to the another logical ring via a failure detecting node that belongs both the failed logical ring and the another logical ring;

whereby the restoration from the failure is attained.

* * * * *

UNITED STATES PATENT AND TRADEMARK OFFICE
CERTIFICATE OF CORRECTION

PATENT NO.  : 5,550,805
DATED       : Aug. 27, 1996
INVENTOR(S) : Masahiro Takatori et al Page 1 of 3

It is certified that error appears in the above-indentified patent and that said Letters Patent is hereby corrected as shown below:

| Column | Line | |
|---|---|---|
| 1 | 55 | After "networks" change "," to --;--. |
| 3 | 12 | Delete "and". |
| 4 | 12 | Change "that traffic" to --traffic that--. |
| 4 | 52 | Change "LP-S" to --LP-P--. |
| 5 | 41 | Before "by" insert --is determined--. |
| 6 | 19 | After "(status)" start new paragraph. |
| 7 | 4 | After "RB" delete ",". |
| 7 | 29 | After "exchange" delete "the". |
| 7 | 40 | Change "MI" to --M1--. |
| 7 | 57 | Before "ring" insert --a--. |
| 7 | 63 | Before "against" delete "to". |
| 7 | 65 | Delete "all". |

UNITED STATES PATENT AND TRADEMARK OFFICE
CERTIFICATE OF CORRECTION

PATENT NO. : 5,550,805
DATED : Aug. 27, 1996
INVENTOR(S) : Masahiro Takatori et al It is certified that error appears in the above-indentified patent and that said Letters Patent is hereby corrected as shown below:

| Column | Line | |
|---|---|---|
| 8 | 1 | Change "detect" to --detects--. |
| 8 | 10 | Change "other" to --another--. |
| 8 | 11 | Change "other" to --another--. |
| 8 | 13 | Change "set" to --sets--. |
| 8 | 51 | Change "request" to --requests--. |
| 9 | 31 | Change "MI" to --M1--. |
| 9 | 44 | Change "other" to --another--. |
| 10 | 15 | Change "MI" to --M1--. |
| 10 | 18 | Change "defects" to --detects--. |
| 10 | 27 | Change "other" to --another--. |
| 10 | 61 | After "provided" insert --,--. |

UNITED STATES PATENT AND TRADEMARK OFFICE
CERTIFICATE OF CORRECTION

PATENT NO. : 5,550,805
DATED : Aug. 27, 1996
INVENTOR(S) : Masahiro Takatori et al It is certified that error appears in the above-indentified patent and that said Letters Patent is hereby corrected as shown below:

| Column | Line | |
|---|---|---|
| 10 | 67 | After "9 to 10" insert --data--. |
| 11 | 21 | Change "other" to --another--. |
| 12 | 20 | After "of" insert --the--. |
| 12 | 64 | Before "end" insert --the--. |
| 13 | 2 | Change "failed a" to --a failed--. |
| 13 | 17 | After "node" insert --which--. |
| 14 | 18 | Before "both" insert --to--. |

Signed and Sealed this

Twenty-fifth Day of March, 1997

Attest:

BRUCE LEHMAN

Attesting Officer

Commissioner of Patents and Trademarks